(12) United States Patent
Itzkowitz

(10) Patent No.: US 11,344,147 B2
(45) Date of Patent: May 31, 2022

(54) APPARATUS AND METHOD FOR COLD BREWING BEVERAGES

(71) Applicant: The Steelstone Group, LLC, Brooklyn, NY (US)

(72) Inventor: Binyumen Itzkowitz, Brooklyn, NY (US)

(73) Assignee: The Steelstone Group LLC, Brooklyn, NY (US)

( * ) Notice: Subject to any disclaimer, the term of this patent is extended or adjusted under 35 U.S.C. 154(b) by 521 days.

(21) Appl. No.: 16/233,814

(22) Filed: Dec. 27, 2018

(65) Prior Publication Data

US 2019/0174947 A1 Jun. 13, 2019

Related U.S. Application Data

(60) Provisional application No. 62/577,841, filed on Oct. 27, 2017.

(51) Int. Cl.
| | |
|---|---|
| A47J 31/053 | (2006.01) |
| A47J 31/06 | (2006.01) |
| A47J 31/00 | (2006.01) |
| A23F 5/26 | (2006.01) |
| A47J 31/46 | (2006.01) |
| A23F 3/18 | (2006.01) |
| A47J 31/44 | (2006.01) |
| A23F 5/24 | (2006.01) |

(52) U.S. Cl.
CPC ............ *A47J 31/0636* (2013.01); *A23F 3/18* (2013.01); *A23F 5/262* (2013.01); *A47J 31/002* (2013.01); *A47J 31/053* (2013.01); *A47J 31/446* (2013.01); *A47J 31/468* (2018.08); *A23F 5/243* (2013.01); *A47J 31/0615* (2013.01); *A47J 31/44* (2013.01)

(58) Field of Classification Search
CPC ...... A47J 31/053; A47J 31/0615; A47J 31/44; A47J 31/468; A23F 5/262; A23F 5/26; A23F 5/243
USPC ........................... 99/308, 309, 310, 311, 312
See application file for complete search history.

(56) References Cited

U.S. PATENT DOCUMENTS

| | | | | |
|---|---|---|---|---|
| 1,782,958 A | * | 11/1930 | Dym ..................... | A47J 31/053 219/436 |
| 2,552,169 A | * | 5/1951 | Graham ................ | A47J 31/053 99/282 |
| 3,682,089 A | * | 8/1972 | Unger ................... | A47J 31/053 99/281 |
| 5,868,062 A | * | 2/1999 | Enomoto .............. | A47J 31/053 99/282 |
| 2005/0103203 A1 | * | 5/2005 | Takizawa ............. | A47J 31/4478 99/279 |

(Continued)

*Primary Examiner* — Reginald Alexander
(74) *Attorney, Agent, or Firm* — Myers Wolin, LLC

(57) ABSTRACT

An apparatus and a method for cold brewing beverages are provided. The apparatus comprises a container and at least one insert arranged in the container. The insert may either be a filter for holding brewing material or a receptacle for holding cooling material. A liquid like water filled in the container is pumped through a conduit into the insert and is then returned to the container, from where it may be pumped again to the insert. Thus a cycle for brewing and cooling a beverage is provided, depending on whether the insert is a filter for holding brewing material or a receptacle for holding cooling material, thereby considerably reducing the time required to produce a cold-brewed beverage.

20 Claims, 5 Drawing Sheets

(56) References Cited

U.S. PATENT DOCUMENTS

2007/0017381 A1* 1/2007 Takizawa .............. A47J 31/057
 99/279
2011/0271842 A1* 11/2011 Garvey ................. A47J 31/053
 99/288
2018/0368612 A1* 12/2018 Stein ..................... A47J 31/467

* cited by examiner

APPARATUS AND METHOD FOR COLD BREWING BEVERAGES

CROSS-REFERENCE TO RELATED APPLICATIONS

This application claims the benefit of U.S. Provisional Application No. 62/577,841, filed Oct. 27, 2017, the contents of which are incorporated by reference herein.

FIELD OF THE INVENTION

This invention relates generally to the field of preparation of beverages. More specifically, to an apparatus and a method for cold brewing beverages like coffee or tea in reduced time.

BACKGROUND

Cold brewing is a method for providing cooled or iced beverages. Typically, for preparing a cooled or iced brewed beverage a hot-brewed beverage is refrigerated or cooled by adding ice. However, when ice is added to a hot-brewed beverage, such as hot-brewed coffee, the ice slowly dilutes, resulting in a weaker-tasting beverage. On the other hand, known methods of cold brewing beverages generally start from a concentrate, which is meant to be watered down. For example, for preparing a concentrate for cold brewed coffee, water is added to a lot of ground coffee, more than would be typically used to brew drip coffee. The mixture is let to sit between eight and 24 hours, and then the mixture is filtered. The resulting concentrate has to be diluted with water or milk. Thus, the preparation of a cold brewed beverage in the known art is time consuming, making these known methods undesirable for day to day use.

SUMMARY

A cold brewing apparatus for cold brewing beverages is provided, comprising a container, at least one insert arranged in the container, a conduit for transporting a liquid, and a pump for pumping a liquid through the conduit, wherein the conduit is arranged between the container and the insert such that a liquid stored in the container can be pumped with the pump from the container to the insert, the liquid returning through the insert to the container.

Preferably, the at least insert is at least one of a filter for holding brewing material and a receptacle for holding cooling means. Preferably the cold brewing apparatus comprises two inserts, wherein a first insert is a filter for holding brewing material and wherein a second insert is a receptacle for holding cooling means, wherein the filter and the receptacle can be at least one of being replaced with each other or being arranged simultaneously in the container.

Expediently the at least one insert is mounted in an upper opening of the container. Further preferably the at least one insert comprises a passageway for receiving an upper end of the conduit. Still further preferably the passageway is disposed centrally in a bottom of the insert. Advantageously the cold brewing apparatus comprises a removable cover mounted on an upper opening of the at least one insert.

Preferably the container is a pitcher.

Particularly preferably the cold brewing apparatus comprises a removable lid arranged on an upper side of the container, wherein the at least one insert and the conduit are arranged in an interior space formed by the container and the lid.

Advantageously the container further comprises a bottom and a container inlet and a container outlet in said bottom.

Preferably the conduit is removable.

Further preferably the conduit is a liquid fountain arranged in the container and extending from a bottom of the container and with its upper end through the passageway of the at least one insert.

Advantageously the liquid fountain is disposed centrally in the container.

Expediently the conduit is connected with a lower end to the container inlet.

Preferably the cold brewing apparatus further comprises a base, wherein the pump is arranged in the base, and wherein the container is arranged on the base so that the container inlet is connected to an outlet of the pump and the container outlet is connected to an inlet of the pump.

The cold brewing apparatus may further comprise a controller for controlling a brewing process.

Preferably the controller is configured for controlling a time of a brewing process.

Further preferably the controller is arranged in a base.

The base of the cold brewing apparatus may further comprise a display and at least one button for operating the cold brewing apparatus.

Preferably the base further comprises a drain valve.

Advantageously the at least one button is configured for operating the controller.

Furthermore, a method for cold brewing beverages is provided comprising the steps of filling a liquid in a container, pumping the liquid with a pump via a conduit for transporting a liquid from the container to a filter holding brewing material, the liquid passing through the brewing material, thereby producing a beverage, and returning the beverage from the filter to the container.

Advantageously the method for cold brewing beverages further comprises the steps of replacing the filter with a receptacle holding cooling material; pumping the beverage from the container via the conduit to the receptacle, the beverage being cooled by passing through the cooling material in the receptacle, and returning the cooled beverage to the container.

Expediently the method further comprises the steps of filling brewing material into the filter and covering the filter with a cover and mounting the filter holding the brewing material into an upper opening of the container.

Still further preferably the liquid is water.

Advantageously the brewing material is ground coffee.

Particularly preferably the cooling material is ice.

DETAILED DESCRIPTION OF THE PREFERRED EMBODIMENTS

Figure 1:
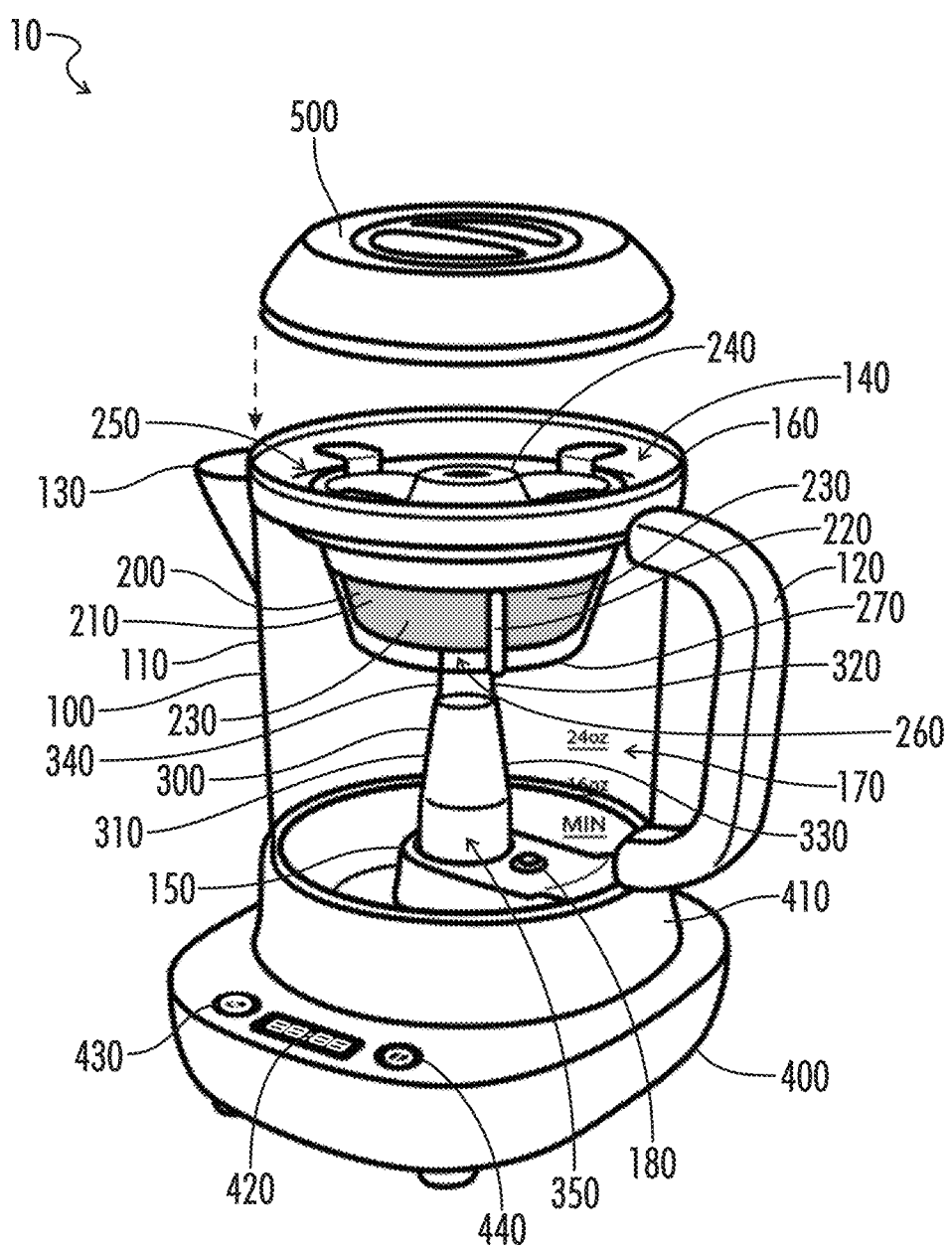
FIG. 1 shows a cold brewing apparatus in a first configuration.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

The invention is described in connection with the accompanying FIGS. 1 to 6.

FIG. 1 shows one embodiment of a cold brewing apparatus 10 in a perspective view. The apparatus comprises a container 100 configured as a pitcher 110 comprising a handle 120 and a spout 130. In an upper opening 140 of container 100 an insert 200 configured as a filter 210 for holding brewing material is arranged. Filter 210 comprises cage 220 and filter elements 230 held in place by cage 220. Filter 210 comprising cage 220 and filter elements 230 is preferably bowl-shaped for receiving and holding brewing material such as ground coffee or tea leaves. Filter 210 can be removed from container 100 and replaced with another insert. Filter 210 is closed with a cover 240 arranged on an upper opening 250 of filter 210. A removable conduit 300 for transporting liquids and configured as a liquid fountain 310 is arranged inside of container 100 of brewing apparatus 10 and extends from a bottom 150 of container 100 and with an upper end 320 through a passageway 260 centrally disposed in bottom 270 of filter 210. In the disclosed embodiment, liquid fountain 310 preferably has a sectional structure with conically tapered sections 330, 340 arranged on top of each other, wherein lower conical section 330 is tapered more than upper conical section 340.

Filter 210 is mounted in upper opening 140 of container 100 and held by holding means. Holding means can be either arranged on container 100 or on liquid fountain 310. For example, filter 210 may rest on rim 160 of container 100, for example the filter 210 comprises a flange for resting on rim 160. Or filter 210 may rest on liquid fountain 310. In the latter case, passageway 260 of filter 210 may be formed conically so that the upper conical section 340 of liquid fountain 310 fits snuggly in passageway 260 of filter 210, thereby holding filter 210 in the upper opening 140 of container 100. Other methods of holding filter 210 in upper opening 140 of container 100 will be readily available to the person having ordinary skill in the art.

Figure 3:
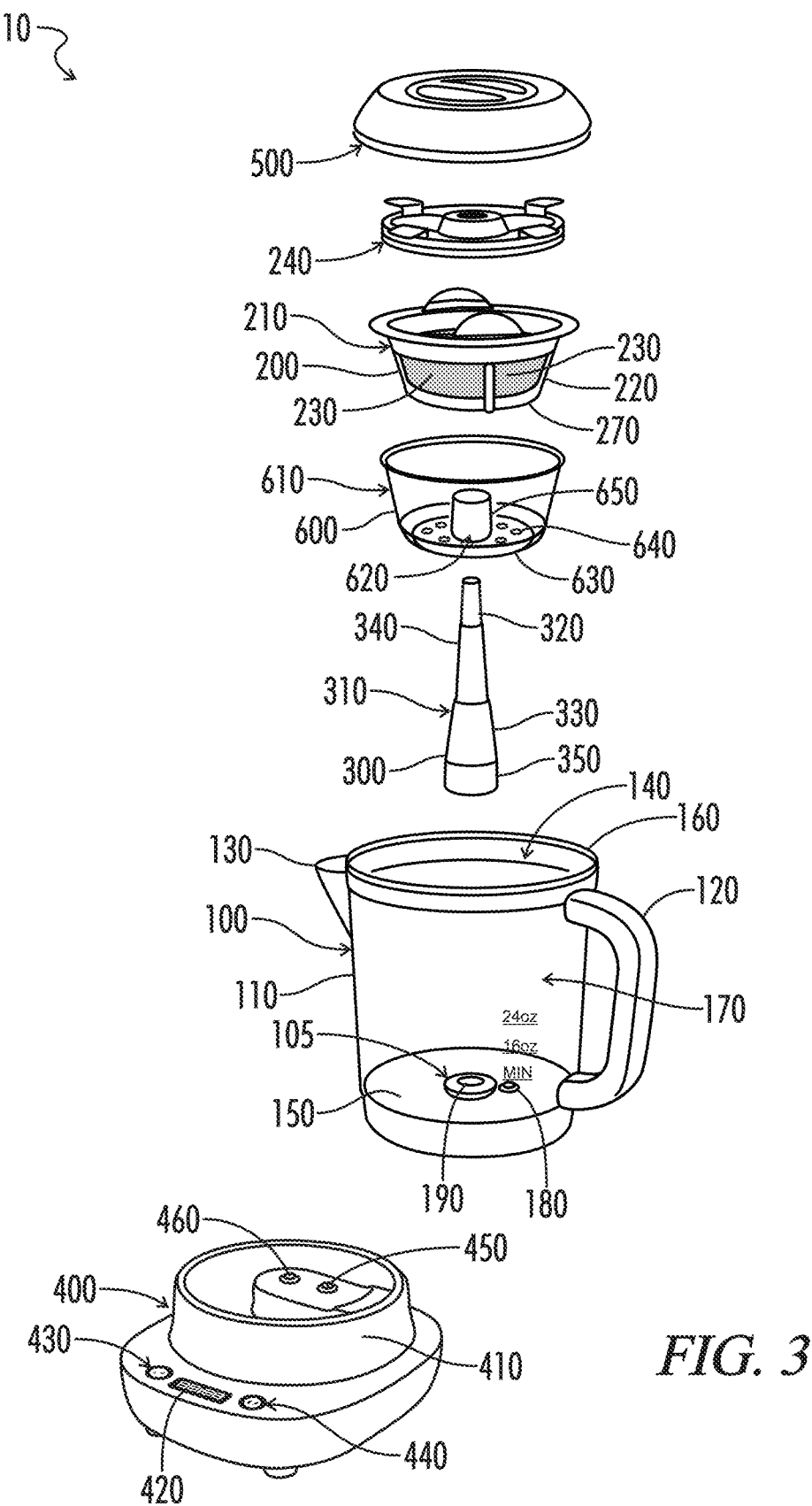
FIG. 3 shows a cold brewing apparatus in an exploded view.

Container 100 is arranged in base 400. Base 400 comprises collar 410 to receive container 100. Base 400 further comprises a display 420 configured to display information of a brewing process. In particular, display 420 may display a brewing time or brewing modes. Furthermore, base 400 comprises a first button 430 for setting a brewing time or a brewing mode and a power button 440 to start or cancel a brewing process. Other control systems not described or illustrated are contemplated. Brewing apparatus 10 further comprises lid 500. In FIG. 1, lid 500 is shown detached from container 100. In the fully assembled state, lid 500 is arranged on top of container 100 covering upper opening 140 of container 100 such that liquid fountain 310 and filter 210 are arranged inside an interior space 170 formed by container 100 and lid 500. Bottom 150 of container 100 comprises a container outlet 180 in fluid communication with a pump inlet 450 of a pump arranged inside of base 400 (FIG. 3). Pump inside base 400 comprises a pump outlet 460 in fluid communication with a container inlet 190 disposed in bottom 150 of container 100. Liquid fountain 310 is connected with a lower end 350 to a fountain connector 105 on bottom 150 of container 100, the fountain connector 105 being in fluid communication with container inlet 190. Base 400 further comprises a controller for controlling a brewing process, in particular a time of a brewing process. Buttons 430 and 440 are configured for operating the controller. Other methods of controlling the apparatus 10 are contemplated.

In one embodiment, for starting the brewing process a brewing time is set with the first button 430 and the brewing process is started by pressing power button 440. Pump arranged inside base 400 pumps water disposed inside container 100 via container outlet 180, pump inlet 450, pump outlet 460 and container inlet 190 through liquid fountain 310 connected to fountain connector 105. Water pumped through liquid fountain 310 is discharged from the liquid fountain 310 into filter 210. Water flows through brewing material arranged in filter 210, thereby producing a beverage. The produced beverage then returns through filter 210 back to container 100, from where it may be pumped again through liquid fountain 310 into filter 210. Thus, in the brewing process water and the produced beverage are cycled through the brewing apparatus 10 and are flowing potentially several times through filter 210 and brewing material disposed therein.

Figure 2:
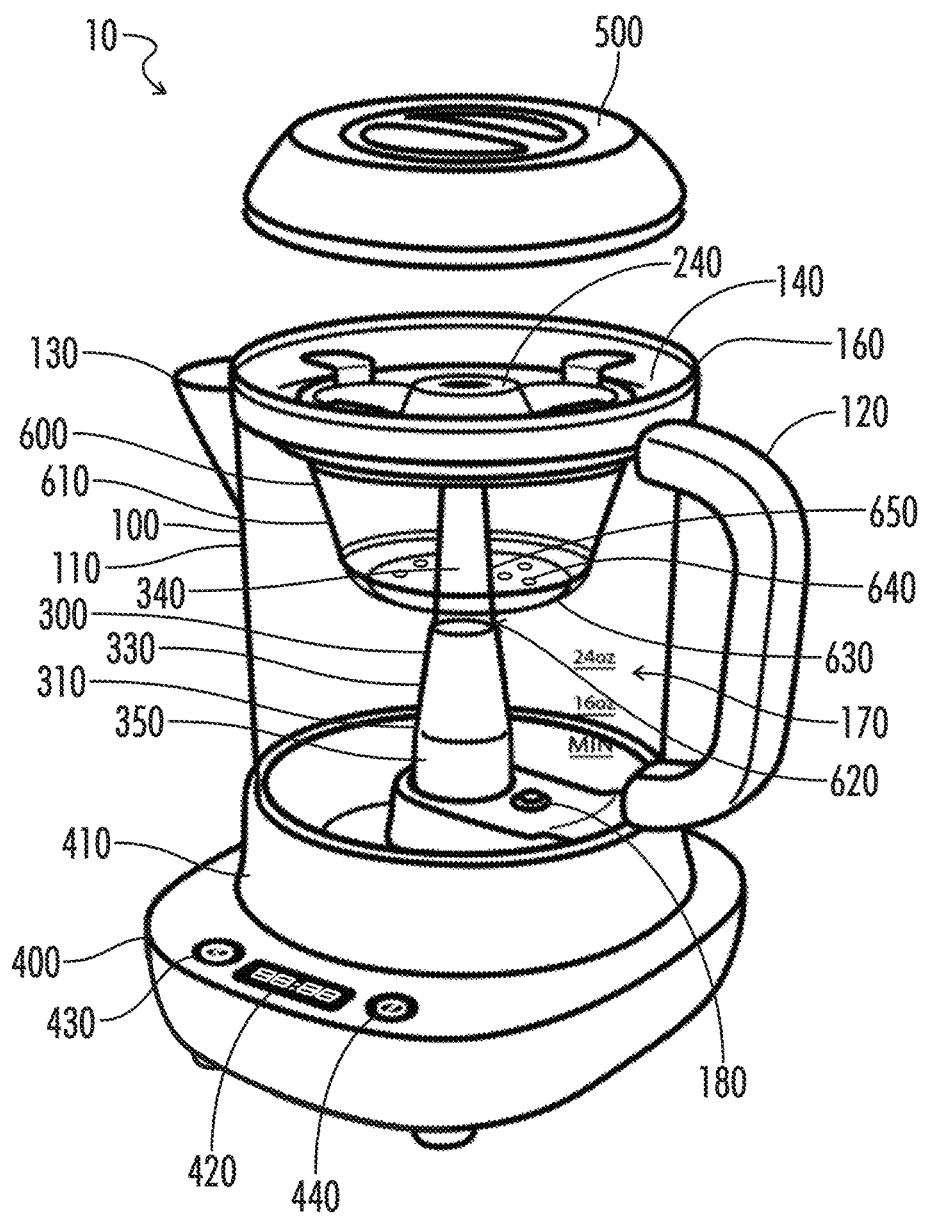
FIG. 2 shows a cold brewing apparatus in a second configuration.

When the brewing process has finished, lid 500 is removed from upper opening 140 of container 100. Subsequently, filter 210 holding used brewing material is removed from container 100. Then, a second insert 600 configured as a receptacle 610 for holding cooling material is arranged in upper opening 140 of container instead of filter 210. This arrangement is shown in FIG. 2. In one embodiment, the cooling material is ice, in particular ice cubes or crushed ice. Receptacle 610 comprises a passageway 620 arranged centrally in bottom 630 of receptacle 610. Receptacle 610 is held in upper opening 140 of container 100. Receptacle 610 may rest with a flange on upper rim 160 of container 100. Alternatively or additionally, receptacle 610 may be held in upper opening of container 100 by liquid fountain 310. In the latter case, passageway 620 of receptacle 610 may comprise a socket 650 shaped conically tapered so that upper conical section 340 of liquid fountain 310 fits snuggly in socket 650 of passageway 620 of receptacle 610, thereby holding receptacle 610 in the upper opening 140 of container 100. Receptacle 610 furthermore comprises outlets 640 disposed in bottom 630. In FIG. 2 lid 500 is shown detached from container 100. In the fully assembled state lid 500 is arranged on top of container 100 covering upper opening 140 of container 100 such that liquid fountain 310 and receptacle 610 are arranged inside an interior space 170 formed by container 100 and lid 500. Apart from the arrangement of receptacle 610 instead of filter 210 in upper opening 140 of container, the embodiments in FIGS. 1 and 2 are identical. In particular, the embodiments in FIGS. 1 and 2 show two configurations of the same cold brewing apparatus 10, wherein each of the configurations is obtainable from the other by replacing the filter 210 with the receptacle 610 or vice versa.

In a second configuration of the cold brewing apparatus 10 shown in FIG. 2 the beverage produced in the brewing process with cold brewing apparatus 10 of FIG. 1 is cooled in a cooling process. Beverage brewed in the brewing process is disposed in container 100. By pressing the first button 430 for e.g. 3 seconds, a cooling program is selected. The cooling process is started by then pressing the power button 440. During the execution of the cooling process, the beverage disposed inside container 100 is pumped with the pump inside base 400 via container outlet 180, pump inlet 450, pump outlet 460 and container inlet 190 through liquid fountain 310 connected to fountain connector 105. The beverage pumped through liquid fountain 310 is discharged from liquid fountain 310 into receptacle 610. Beverage flows through cooing material arranged in receptacle 610, thereby producing a cooled beverage. The produced cooled beverage then returns through outlets 640 of receptacle 610 back to container 100, from where it may be pumped again through liquid fountain 310 into receptacle 610. Thus, in the cooling process the beverage is cycled through the brewing apparatus 10 and flows potentially several times through receptacle 610 and cooing material disposed therein. At the end of the cooling process container 100 contains cooled beverage such as cooled brewed coffee.

FIG. 3 shows one embodiment of an exploded view of cold brewing apparatus 10. The cold brewing apparatus 10 comprises base 400, container 100, liquid fountain 310, receptacle 610, filter 210, cover 240 and lid 500, shown in this order starting from the bottom of FIG. 3 to the top. In FIG. 3 both the filter 210 and receptacle 610 are shown since they both may be part of the brewing apparatus 10 simultaneously. However it is also possible, that only one of filter 210 or receptacle 610 is present in cold brewing apparatus 10. FIG. 3 shows the parts of brewing apparatus 10 in more detail. Base 400 comprises pump inlet 450 and pump outlet 460, while container 100 comprises container outlet 180 and container inlet 190. Container inlet 190 is in fluid communication with fountain connector 105. When container 100 is arranged on base 400 as shown in FIGS. 1 and 2, container outlet 180 is in fluid communication with pump inlet 450 and container inlet 190 is in fluid communication with pump outlet 460. Liquid fountain 310 comprises a lower conically tapered section 330 and an upper conically tapered section 340. Receptacle 610 comprises passageway 620 arranged centrally in the bottom 630 of receptacle 610. Furthermore, passageway 620 of receptacle 610 is preferably formed as a conically tapered socket 650 configured such that upper conically tapered section 340 of liquid fountain 310 fits snugly inside socket 650. When receptacle 610 is thus placed on liquid fountain 310 so that upper end 320 of liquid fountain 310 extends through passageway 620 of receptacle 610, receptacle 610 is supported by the interaction between socket 650 and upper conically tapered section 340 of liquid fountain 310.

Figure 4:
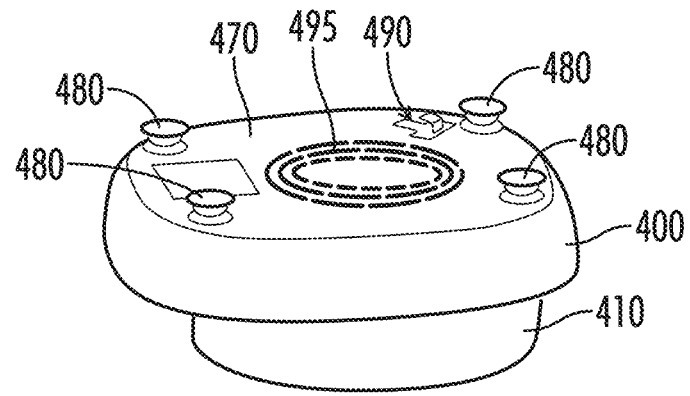
FIG. 4 is a view of a lower side of a base for a cold brewing apparatus.

FIG. 4 shows an underside 470 of base 400. Underside 470 comprises feet 480 for supporting brewing apparatus 10 when disposed on a surface, such as a kitchen table. Furthermore, base 400 comprises a drain valve 490 to drain pump and base 400 for cleaning purposes from any beverage remaining in base 400 after the brewing process or the cooling process. Still further, base 400 comprises a ring shaped grid 495 for ventilation or sound emission.

Figure 5:
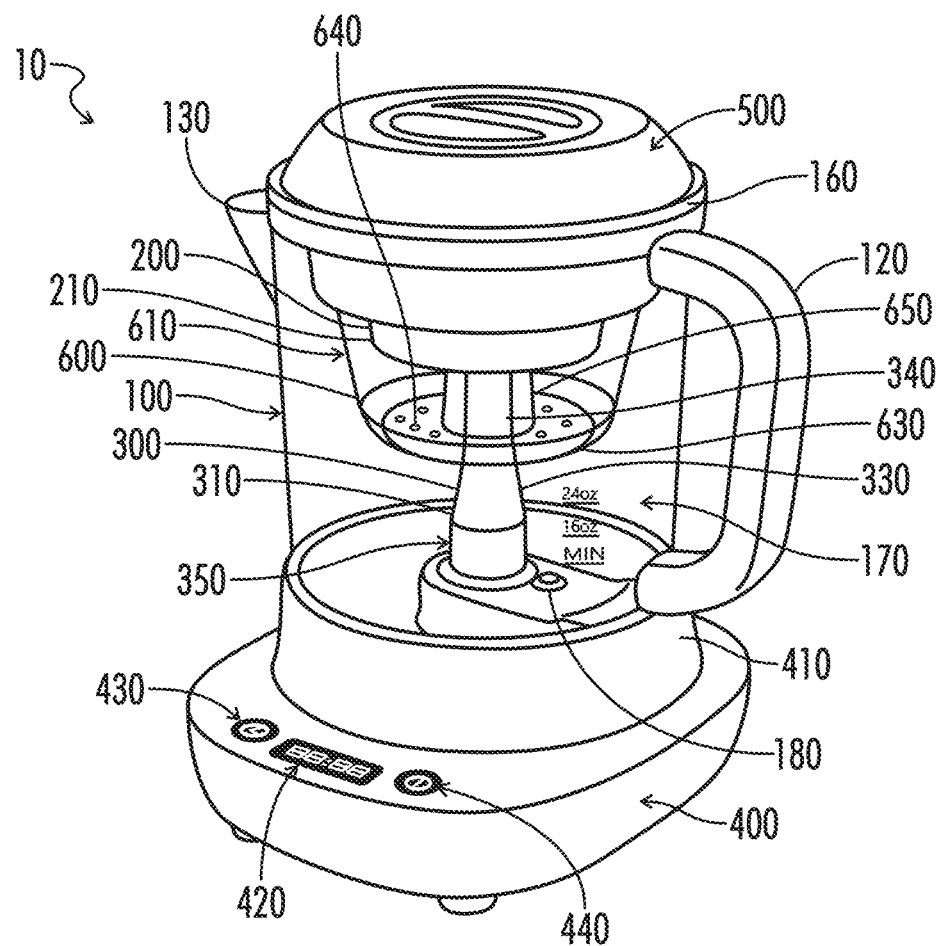
FIG. 5 shows a cold brewing apparatus in a third configuration.

FIG. 5 shows a further configuration of cold brewing apparatus 10. In the configuration of FIG. 5 both the filter 210 and receptacle 610 are arranged inside interior space interior space 170 formed by container 100 and lid 500, receptacle 610 being disposed below filter 210. Filter 210 and receptacle 610 are disposed in upper opening 140 of container 100 simultaneously. While filter 210 may rest on rim 160 of container 100 for support, receptacle 610 may rest with socket 650 on upper conically shaped section 340 of liquid fountain 310. However other ways of holding both filter 210 and receptacle 620 simultaneously in upper opening 140 of container 100 may be contemplated. For example, filter 210 and receptacle 610 my both rest on upper conically tampered section 340 of liquid fountain or filter 210 and receptacle 610 may both rest on upper rim 160 of container 100. In the configuration shown in FIG. 5, brewing process and cooling process can be executed simultaneously. After setting the brewing and cooling time with first button 430 and starting the combined brewing and cooling process by pressing power button 440, pump arranged inside base 400 pumps water disposed inside container 100 via container outlet 180, pump inlet 450, pump outlet 460 and container inlet 190 through liquid fountain 310 connected to fountain connector 105. The water pumped through liquid fountain 310 is discharged from liquid fountain 310 into filter 210. Water flows through brewing material arranged in filter 210, thereby producing a beverage. The produced beverage then flows through filter 210 into receptacle 610 disposed below filter 210, where it is cooled by flowing over cooling material such as ice disposed in receptacle 610. Afterwards, the cooled beverage returns through outlets 640 disposed in bottom 630 of container 100 back to container 100, from where it may be pumped again through liquid fountain 310 into filter 210.

Figure 6:
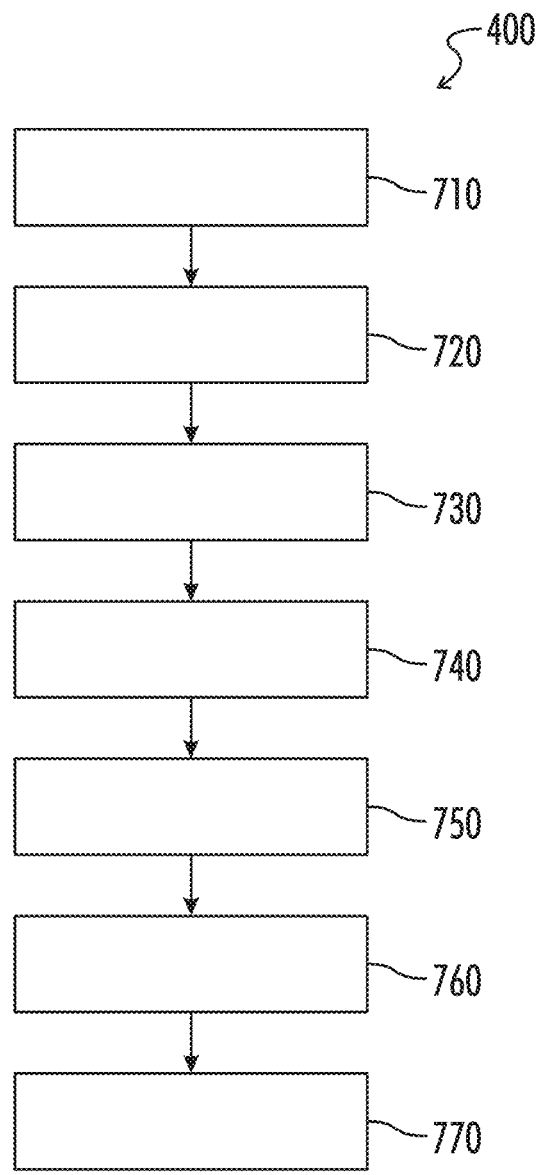
FIG. 6 shows a flow chart of a method for cold brewing beverages.

FIG. 6 discloses a method 700 for cold brewing a beverage. In step 710, liquid fountain 310 is connected to fountain connector 105 disposed in bottom 150 of container 100, fountain connector 105 being in fluid communication with container inlet 190 in bottom 150 of container 100. In step 720, the container 100 is filled with water and container 100 is arranged on base 400 of a cold brewing apparatus 10 such that container outlet 180 is in fluid communication with pump inlet 450 of base, pump inlet 450 being in fluid communication with pump disposed inside base 400, and such that container inlet 190 of container 100 is in fluid communication with pump outlet 460 in base 400, pump outlet 460 being in fluid communication with pump inside base 400. In step 730, brewing material like ground coffee is arranged in filter 210 and filter 210 is mounted in upper opening 140 of container 100 is such a way that upper end 320 of liquid fountain 310 extends through passageway 260 of filter 210. In step 740, cover 240 is arranged on an upper opening 250 of filter 210 and lid 500 is arranged on top of container 100 so that water, liquid fountain 310, filter 210 holding brewing material and cover 240 are arranged inside an interior space 170 formed by container 100 and lid 500. In step 750, a brewing process is started by setting brewing time with first button 430 of base 400 and pressing power button 440 of base 400. In the brewing process pump arranged inside base 400 pumps water disposed inside container 100 via container outlet 180, pump inlet 450, pump outlet 460 and container inlet 190 through liquid fountain 310 connected to fountain connector 105. Water pumped through liquid fountain 310 is discharged from liquid fountain 310 into filter 210. Water flows through brewing material arranged in filter 210, thereby producing a beverage. The produced beverage then returns through filter 210 back to container 100, from where it may be pumped again through liquid fountain 310 into filter 210. Thus, in the brewing process water and the produced beverage are cycled through the brewing apparatus 10 and are flowing potentially several times through filter 210 and brewing material disposed therein. In step 760, lid 500, cover 240 and filter 210 are removed and receptacle 610 holding cooling means such as ice is disposed in upper opening 140 of container 100. Upper end 320 of liquid fountain 310 is guided through passageway 620 of receptacle so that conically tapered socket 650 of receptacle 610 rests on upper conically tapered section 340 of liquid fountain 310. Then cover 240 is placed on receptacle 610 and lid 500 is placed on top of container 100 so that beverage, liquid fountain 310, receptacle 610 holding cooling material and cover 240 are arranged inside interior space 170 formed by container 100 and lid 500. In step 770, a cooling process is started by setting cooling mode with first button 430 of base 400 and pressing power button 440 of base 400. In the cooling process, pump arranged inside base 400 pumps beverage disposed inside container 100 via container outlet 180, pump inlet 450, pump outlet 460 and container inlet 190 through liquid fountain 310 connected to fountain connector 105. Beverage pumped through liquid fountain 310 is discharged from liquid fountain 310 into receptacle 610. Beverage flows through cooling material arranged in receptacle 610, thereby producing a cooled beverage. The produced cooled beverage then returns through outlets 640 of receptacle 610 back to container 100, from where it may be pumped again through liquid fountain 310 into receptacle 610. Thus, in the cooling process beverage and the produced cooled beverage are cycled through the brewing apparatus 10 and are flowing potentially several times through receptacle 610 and cooling material disposed therein. After the end of cooling process lid 500, cover 240 and receptacle 610 are removed. Container 100 may be removed from base 400 and cooled brewed beverage may be poured into a cup for enjoyment.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A cold brewing apparatus for cold brewing beverages comprising:
   a container;
   at least one insert arranged in the container;
   a conduit for transporting a liquid; and
   a pump for pumping a liquid through the conduit;
   wherein the conduit is arranged between the container and the insert such that a liquid stored in the container can be pumped with the pump from the container to the insert, the liquid returning through the insert to the container,
   wherein the at least one insert comprises first and second inserts,
   wherein the first insert is a filter for holding brewing material, the second insert is a receptacle for holding cooling means, and the liquid is configured to be circulated between the container and the receptacle, and
   wherein the filter and the receptacle are located at the same location within the container consecutively or are nested and are simultaneously located in the container.

2. The cold brewing apparatus of claim 1, wherein the at least one insert is at least one of a filter for holding brewing material and a receptacle for holding cooling means.

3. The cold brewing apparatus of claim 1, wherein the at least one insert is mounted in an upper opening of the container.

4. The cold brewing apparatus of claim 1, wherein the at least one insert comprises a passageway for receiving an upper end of the conduit.

5. The cold brewing apparatus of claim 4, wherein the passageway is disposed centrally in a bottom of the insert.

6. The cold brewing apparatus of claim 1, further comprising a removable cover mounted on an upper opening of the at least one insert.

7. The cold brewing apparatus of claim 1, further comprising a removable lid arranged on an upper side of the container, wherein the at least one insert and the conduit are arranged in an interior space formed by the container and the lid.

8. The cold brewing apparatus of claim 1, wherein the container further comprises a bottom and a container inlet and a container outlet in said bottom.

9. The cold brewing apparatus of claim 1, wherein the conduit is removable.

10. The cold brewing apparatus of claim 4, wherein the conduit is a liquid fountain arranged in the container and extending from a bottom of the container and with its upper end through the passageway of the at least one insert, and
    wherein the liquid fountain is disposed centrally in the container.

11. The cold brewing apparatus of claim 8, wherein the conduit is connected with a lower end to the container inlet.

12. The cold brewing apparatus of claim 8, further comprising a base, wherein the pump is arranged in the base; and wherein the container is arranged on the base so that the container inlet is connected to an outlet of the pump and the container outlet is connected to an inlet of the pump.

13. The cold brewing apparatus of claim 1, further comprising a controller for controlling a brewing process.

14. The cold brewing apparatus of claim 13, wherein the controller is configured for controlling a time of a brewing process.

15. The cold brewing apparatus of claim 12, wherein the base further comprises a display and at least one button for operating the cold brewing apparatus.

16. A cold brewing apparatus for cold brewing beverages comprising:
   a container;
   at least one insert arranged in the container;
   a conduit for transporting a liquid; and
   a pump for pumping a liquid through the conduit;
   wherein the conduit is arranged between the container and the insert such that a liquid stored in the container can be pumped with the pump from the container to the insert, the liquid returning through the insert to the container,
   wherein the cold brewing apparatus further comprises a base, and
   wherein the base further comprises a drain valve.

17. A method for cold brewing beverages comprising:
   partially filling a container with a liquid, the container having a first insert arranged in the container, the first insert having a filter holding brewing material;
   pumping a liquid with a pump via a conduit to transport the liquid from a location in the container outside of the first insert, to the first insert, wherein the liquid is transported above the brewing material held by the first insert; and
   flowing the liquid downward through the brewing material and a bottom of the first insert into to the location in the container outside of the first insert; and
   continuing to transport, with the pump via the conduit from the location in the container outside of the first insert to the first insert, the liquid that is returned from the first insert to the location in the container outside of the first insert,
   wherein the container has a second insert and the second insert is a receptacle for holding cooling means, wherein
   wherein the method further comprises circulating the liquid between the container and the receptacle, and the filter and the receptacle are located at the same location within the container consecutively or are nested and are simultaneously located in the container.

18. The method of claim 17, wherein the second insert holds cooling material, and
   wherein the method further comprises:
   replacing the first insert with the second insert;
   pumping the liquid to transport the liquid from a location in the container outside of the second insert via the conduit to the second insert, the liquid being cooled by passing through the cooling material in the second insert;
   returning the cooled liquid to the container; and
   continuing to transport, with the pump via the conduit from the location in the container outside of the second insert to the second insert, the liquid that is returned from the second insert to the location in the container outside of the second insert.

19. The method of claim 17, further comprising:
   filling brewing material into the filter prior to pumping the liquid; and
   mounting the first insert into an upper opening of the container.

20. The method of claim 17, wherein the second insert is located within the first insert, and wherein the pumping of the liquid with the pump transports the liquid from a location in the container outside of the first insert to the second insert, such that the liquid flows past the cooling material and flows through the brewing material.

* * * * *